United States Patent
Nakayama et al.

(10) Patent No.: US 8,999,464 B2
(45) Date of Patent: Apr. 7, 2015

(54) OPTICAL FILM AND ITS PRODUCTION METHOD, POLARIZER AND LIQUID CRYSTAL DISPLAY DEVICE

(75) Inventors: Hajime Nakayama, Kanagawa (JP); Katsumi Sasata, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 330 days.

(21) Appl. No.: 13/200,589

(22) Filed: Sep. 27, 2011

(65) Prior Publication Data
US 2012/0076955 A1   Mar. 29, 2012

(30) Foreign Application Priority Data

Sep. 27, 2010  (JP) ................. 2010-214998

(51) Int. Cl.
*G02B 1/04* (2006.01)
*G02B 1/10* (2006.01)
*G02B 5/30* (2006.01)

(52) U.S. Cl.
CPC  *G02B 1/04* (2013.01); *G02B 1/105* (2013.01); *G02B 5/3025* (2013.01)

(58) Field of Classification Search
CPC ........ G02B 1/04; G02B 1/105; G02B 5/3025; C08L 1/12; C08L 33/08; C08L 33/10
USPC ............................ 428/1.33–1.54; 349/96, 122
See application file for complete search history.

(56) References Cited

U.S. PATENT DOCUMENTS

| | | | |
|---|---|---|---|
| 6,794,460 B2 | 9/2004 | Asano et al. | |
| 7,910,654 B2 | 3/2011 | Takeda | |
| 8,139,181 B2 | 3/2012 | Yoshihara et al. | |
| 8,158,218 B2 * | 4/2012 | Yamada et al. | 428/1.1 |
| 8,197,916 B2 | 6/2012 | Suzuki et al. | |
| 2003/0004278 A1 | 1/2003 | Asano et al. | |
| 2003/0134988 A1 | 7/2003 | Asano et al. | |
| 2004/0024198 A1 * | 2/2004 | Shibata et al. | 536/69 |
| 2009/0192256 A1 | 7/2009 | Takeda | |
| 2009/0202822 A1 | 8/2009 | Hasegawa et al. | |
| 2009/0257003 A1 | 10/2009 | Yoshihara et al. | |
| 2010/0233389 A1 | 9/2010 | Suzuki et al. | |
| 2010/0253884 A1 * | 10/2010 | Katou et al. | 349/96 |

FOREIGN PATENT DOCUMENTS

| | | |
|---|---|---|
| CN | 101374901 | 2/2009 |
| CN | 101460306 | 6/2009 |
| EP | 1 865 347 A1 | 12/2007 |

(Continued)

OTHER PUBLICATIONS

JPO Website Machine English Translation of JP 2009-151289, Kato et al., Jul. 9, 2009.*

(Continued)

*Primary Examiner* — Sophie Hon
(74) *Attorney, Agent, or Firm* — Jean C. Edwards, Esq.; Edwards Neils PLLC

(57) ABSTRACT

An optical film having a core layer containing a (meth)acrylic resin having a lactone ring structure, and an outer layer containing a cellulose acetate with a thickness of from more than 3 μm to 20 μm on at least one side of the core layer is excellent in nonbrittleness and adhesiveness to a polarizing element.

12 Claims, 2 Drawing Sheets

(56) References Cited

FOREIGN PATENT DOCUMENTS

| | | |
|---|---|---|
| JP | 5-119217 | 5/1993 |
| JP | 2000-230016 | 8/2000 |
| JP | 2001-151814 | 6/2001 |
| JP | 2002-120326 | 4/2002 |
| JP | 2002-254544 | 9/2002 |
| JP | 2007-316366 | 12/2007 |
| JP | 2008-216910 A | 9/2008 |
| JP | 2008-225463 A | 9/2008 |
| JP | 2009-179651 A | 8/2009 |
| JP | 4385466 B2 | 10/2009 |
| WO | WO 2010/116857 | 10/2010 |
| WO | WO 2010/116858 | 10/2010 |

OTHER PUBLICATIONS

JPO Website Machine English Translation of JP 2001-215331, Shimizu et al., Aug. 10, 2001.*
JPO Website Machine English Translation of JP 2008-225463, Murakami et al., Sep. 25, 2008.*
Derwent Abstract of JP 2001-215331 and JP 4385466 B2, Shimizu et al., Dec. 16, 2009.*
Official Action issued by JPO on Oct. 1, 2013 in connection with corresponding Japanese Patent Application No. 2010-214998.
Official Action issued by State Inetellectual Poperty Office (SIPO) on Oct. 20, 2014 in connection with corresponding Chinese Patent Application No. 201110294631.5.

* cited by examiner

OPTICAL FILM AND ITS PRODUCTION METHOD, POLARIZER AND LIQUID CRYSTAL DISPLAY DEVICE

CROSS-REFERENCE TO RELATED APPLICATIONS

The present application claims the benefit of priority from Japanese Patent Application No. 2010-214998, filed on Sep. 27, 2010, the contents of which are herein incorporated by reference in their entirety.

BACKGROUND OF THE INVENTION

1. Field of the Invention

The present invention relates to an optical film and its production method, a polarizer and a liquid crystal display device.

2. Description of the Related Art

As capable of saving power energy consumption and capable of being thin-walled, liquid crystal display devices are widely employed as image display devices such as TVs, personal computers, etc. The liquid crystal display device comprises a polarizer arranged on both sides of the liquid crystal cell therein, in which the polarizer comprises a polarizing film having iodine or dye adsorbed and aligned therein and sandwiched between transparent resin layers put on both sides thereof. In this, the transparent resin layers act to protect the polarizing element, for which a cellulose ester film is used most generally.

With the recent popularization of such liquid crystal display devices, much desired are further thin-walled, large-sized and high-performance devices. A cellulose ester film widely used as a polarizer protective film has a high transmittance, and by dipping in an aqueous alkali solution, its surface is saponified and hydrophilicated to thereby realize excellent adhesiveness to a polarizing element. However, the film has a problem of dimensional change through moisture absorption and water removal in environmental temperature/humidity change. Another problem is that, when the cellulose ester film is incorporated in a liquid crystal display device and when the other constitutive parts of the device that have been deformed through aging degradation or the like therein are kept in contact with the film, display fluctuation often occurs; and the problem has become considered serious with the recent tendency toward advanced demand for body thickness reduction.

For solving the problems, there has been proposed a (meth)acrylic resin film of methyl methacrylate or the like having a small moisture absorption and having a small photoelastic coefficient, as a film that could be substitutable for the cellulose ester film; however, it could not be said that the adhesiveness of the film of the type to a polarizing element could be sufficient, and therefore there still remains a problem in that the film is readily cracked or broken and is brittle (see Patent Reference 1).

As a resin having a higher mechanical strength than existing (meth)acrylic resin such as methyl methacrylate or the like, there has been proposed a (meth)acrylic resin having a lactone ring structure (see Patent References 2 to 5).

However, in case where such an existing (meth)acrylic resin or a (meth)acrylic resin having a lactone ring structure is directly used as a polarizer protective film as it is, then there occurs a problem in that the adhesiveness thereof to a polarizing element is poor. In particular, in case where the (meth) acrylic resin having a lactone ring structure is used as a polarizer protective film directly as it is and when the film surface is processed for adhesiveness enhancement treatment (for example, corona treatment) for the purpose of enhancing the adhesiveness of the film surface with a polarizing element, then there often occurs cohesion failure around the film surface and therefore there occurs a problem in that the adhesiveness of the film surface to a polarizing element is further poorer than that of the existing (meth)acrylic resin.

As opposed to this, there has been proposed a method of using a film that contains a (meth)acrylic resin having a lactone ring structure, as a polarizer protective film, in which a thin layer of a cellulose resin excellent in adhesiveness is formed on a (meth)acrylic resin layer to form a laminate and the adhesiveness of the laminate to a polarizing element is thereby enhanced (see Patent Reference 6).

[Patent Reference 1] JP-A 5-119217
[Patent Reference 2] JP-A 2000-230016
[Patent Reference 3] JP-A 2001-151814
[Patent Reference 4] JP-A 2002-120326
[Patent Reference 5] JP-A 2002-254544
[Patent Reference 6] JP-A 2007-316366

SUMMARY OF THE INVENTION

The present inventors have investigated the method described in Patent Reference 6, and have known that, when the film described in the patent publication is sued as a polarizer protective film, then the problem of brittleness of the (meth)acrylic resin in the film could not be fully overcome. On the other hand, the production method itself disclosed in the patent publication is also problematic in that the method requires two stages of forming a film of a (meth)acrylic resin and coating the formed film with a cellulose resin and therefore the production efficiency in the method is not good.

An object of the invention is to provide an optical film which is excellent in adhesiveness to polarizing element, which is not brittle, and which, when incorporated in a liquid crystal display device, is free from a trouble of light leakage from the device. Another object is to provide a production method for the optical film excellent in producibility.

The inventors have assiduously studied and, as a result, have found that a film, which comprises a layer of a (meth) acrylic resin having a lactone ring structure and comprises, as the outermost layer thereof, a layer of a cellulose acetate having a sufficient thickness enough to secure the adhesion thereof to a polarizing element and enough to overcome the problem of brittleness of the film, can solve the above-mentioned problems. In addition, the inventors have also found a production method for the optical film excellent in producibility, in which the above-mentioned (meth)acrylic resin and cellulose acetate are simultaneously formed into individual layers through solution co-casting film formation.

Specifically, the invention includes the following constitutions.

[1] An optical film having:
a core layer containing a (meth)acrylic resin having a lactone ring structure, and
an outer layer containing a cellulose acetate and having a thickness of from more than 3 μm to 20 μm on at least one side of the core layer.
[2] The optical film of [1] having three layers, wherein each one outer layer is formed on both sides of the core layer.
[3] The optical film of [1] or [2], wherein the thickness of the core layer is from 10 to 100 μm.
[4] The optical film of any one of [1] to [3], wherein the proportion of the total thickness of the outer layers to the total thickness of the film is from 2 to 40%.
[5] The optical film of any one of [1] to [4], which has a photoelastic coefficient of from −3.0 to 3.0×10$^{-12}$ Pa$^{-1}$.

[5-2] The optical film of any one of [1] to [5], wherein the residual solvent amount in the core layer is at least 0.004% by mass.

[6] A method for producing an optical film comprising:
casting a dope (A) containing a cellulose acylate and an organic solvent and a dope (B) containing a (meth)acrylic resin having a lactone ring structure and an organic solvent onto a casting substrate simultaneously in the order of (A)-(B) from the casting substrate side according to a co-casting process, and
removing the organic solvent,
wherein the casting thickness of the dope (A) is so controlled that the dry thickness of the dope (A) could be from more than 3 μm to 20 μm.

[7] The method for producing an optical film of [6], wherein the dope (A) and the dope (B) are cast onto a casting substrate simultaneously in the order of (A)-(B)-(A) from the casting substrate side according to a co-casting process.

[8] The method for producing an optical film of [6] or [7], wherein the complex viscosity $\eta_A$ of the dope (A) and the complex viscosity $\eta_B$ of the dope (B) are so controlled as to satisfy the relation of the following formula (1).

$$\eta_A \leq \eta_B. \tag{I}$$

[9] The method for producing an optical film of any one of [6] to [8], wherein the dope (A) and the dope (B) both have a complex viscosity at 25° C. of from 10 to 80 Pa·s.

[10] The method for producing an optical film of any one of [6] to [9], wherein the solid concentration in the dope (A) is from 15 to 25% by mass.

[11] An optical film produced according to the method for producing an optical film of any one of [7] to [10].

[12] A polarizer comprising a polarizing element and the optical film of any one of [1] to [6] and [11].

[13] A liquid crystal display device comprising the optical film of any one of [1] to [6] and [11] or the polarizer of [12].

[14] The liquid crystal display device of [13], which is an IPS-mode device.

According to the invention, there can be provided an optical film which is excellent in adhesiveness to polarizing element, which is not brittle, and which, when incorporated in a liquid crystal display device, is free from a trouble of light leakage from the device. The production method for the optical film of the invention is excellent in producibility. The liquid crystal display device comprising the optical film is free from a trouble of display unevenness that may occur when the other parts in the device are kept in contact with the cellulose ester film moiety of the optical film therein.

Figure 1:
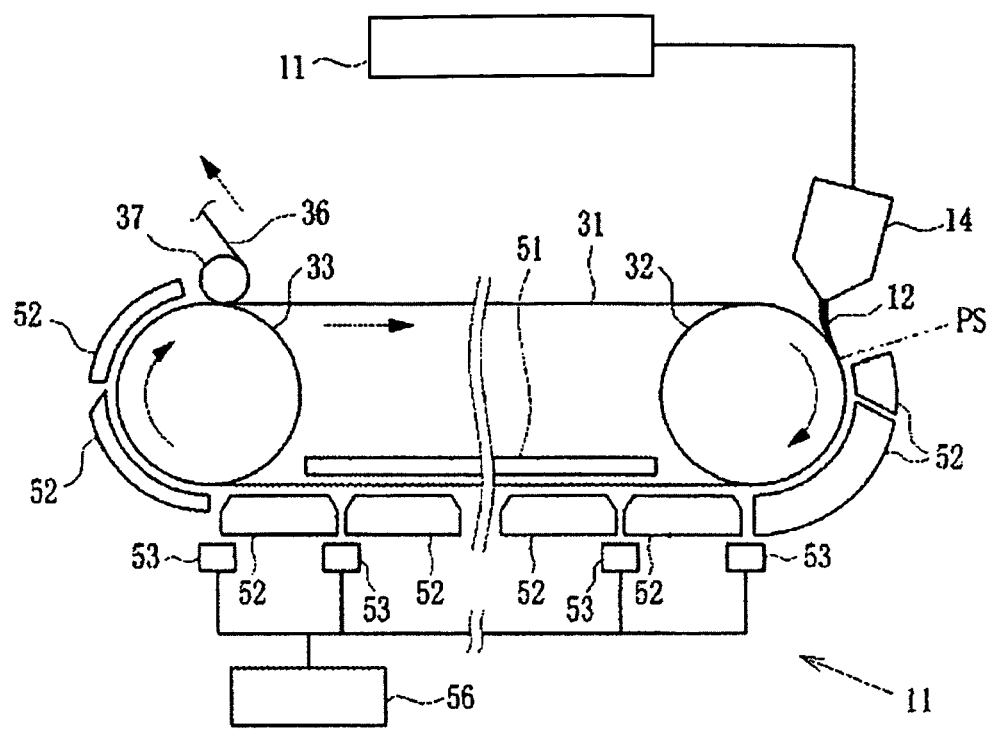
FIG. 1 is a graphical view showing one example of a band casting apparatus. In the drawing, 11 is casting dope preparation apparatus, 11 is casting apparatus, 56 is collector tank.

In the drawings, 11 is casting apparatus, 12 is dope, 14 is casting die, 31 is band, 32 and 33 are backup roller, 36 is film, 37 is peeling roller, 51 is temperature-controlling plate, 52 is condenser plate, 53 is liquid receiver, 56 is collector tank, 101 is casting apparatus, 102 is drum, 105 is condenser plate, and PS is casting start point.

BEST MODE FOR CARRYING OUT THE INVENTION

The optical film and its production method of the invention and the polarizer and the liquid crystal display device comprising the optical film of the invention are described in detail hereinunder.

The description of the constitutive elements of the invention given hereinunder is for some typical embodiments of the invention, to which, however, the invention should not be limited. In this description, the numerical range expressed by the wording "a number to another number" means the range that falls between the former number indicating the lowermost limit of the range and the latter number indicating the uppermost limit thereof.

[Optical Film]

The optical film of the invention (hereinafter this may be referred to as the film of the invention) has a core layer containing a (meth)acrylic resin having a lactone ring structure, and has, as formed on at least one side of the core layer, an outer layer containing a cellulose acetate and having a thickness of from more than 3 μm to 20 μm.

Preferred embodiments of the film of the invention are described below.

<Film Layer Configuration>

(Thickness of Outer Layer)

The optical film of the invention has a core layer containing a (meth)acrylic resin having a lactone ring structure, and has, as formed on at least one side of the core layer, an outer layer containing a cellulose acetate and having a thickness of from more than 3 μm to 20 μm. Having the configuration, the optical film of the invention has the function of bettering the adhesiveness thereof to polarizing element and bettering the nonbrittleness of the film. Preferably, the thickness of the outer layer containing a cellulose acylate is from 3.5 to 15 μm, more preferably from 4 to 8 μm. Having the film layer configuration in which the thickness of the outer layer is specifically defined as above, the photoelastic coefficient of the film of the type can be smaller than that of a laminate film that comprises a core layer of a thick cellulose acylate film and, as formed thereon, a thin surface layer of an acrylic functional layer.

(Thickness of Core Layer)

Preferably, the optical film of the invention exhibits the function as a protective film for polarizing element generally having a thickness of from 20 to 40 μm. Accordingly, the thickness of the core layer that contains a (meth)acrylic resin having a lactone ring structure is preferably from 10 to 100 μm, more preferably from 20 to 80 μm, even more preferably from 20 to 60 μm, still more preferably from 30 to 60 μm.

(Embodiment of Lamination)

The film of the invention has an outer layer of a cellulose acylate on at least one side of the core layer therein that contains a (meth)acrylic resin having a lactone ring structure. The core layer in the invention has a lactone ring and therefore can increase the mechanical strength of the (meth)acrylic resin constituting the layer.

Preferably, the film of the invention has at least one outer layer on both sides of the core layer, more preferably has each one outer layer on both sides of the core layer. Precisely, the film of the invention is so designed that it has a cellulose acylate-containing layer as the outer layer on both sides of the core layer therein and that the outer layer each has a specific thickness, and therefore the mechanical strength (especially bending brittleness resistance) of the film can be greatly bettered. As compared with a single-layer cellulose acylate film, the optical film of the invention can be improved to such a degree that its mechanical strength could be on a satisfactory level.

The total thickness of the optical film in the form of a laminate of the invention is preferably from 11 to 240 μm, more preferably from 15 to 150 μm, most preferably from 20 to 100 μm, especially preferably from 20 to 60 μm.

Also preferably, the proportion of the total thickness of the outer layer to the total thickness of the film of the invention is from 2 to 40%, more preferably from 3 to 30%, even more preferably from 5 to 20%. In this, the total thickness of the outer layer means the total thickness of two outer layers when the film has two outer layers.

(Film Width)

Preferably, the width of the film of the invention is from 400 to 2500 mm, more preferably at least 1000 mm, even more preferably at least 1500 mm, still more preferably at least 1800 mm.

The details and the preferred embodiments of the ingredients constituting each layer of the film of the invention are described below.

The configuration of the core layer and the outer layer is described in order.

<Core Layer>

The optical film of the invention has a core layer containing a (meth)acrylic resin having a lactone ring structure. In this description, (meth)acrylic resin is a concept of including both methacrylic resin and acrylic resin. In addition, (meth)acrylic resin includes acrylate/methacrylate derivatives, especially acrylate/methacrylate (co)polymers.

(Lactone Ring-Having (Meth)Acrylic Resin)

Preferably, the (meth)acrylic resin having a lactone ring structure has a lactone ring structure represented by the following formula (1):

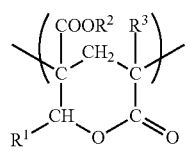
(1)

wherein $R^1$, $R^2$ and $R^3$ each independently represent a hydrogen atom, or an organic residue having from 1 to 20 carbon atoms. The organic residue may contain an oxygen atom.

The content of the lactone ring structure represented by the formula (1) in the structure of the (meth)acrylic resin having a lactone ring structure is preferably from 5 to 90% by weight, more preferably from 10 to 70% by weight, even more preferably from 10 to 60% by weight, still more preferably from 10 to 50% by weight. When the content of the lactone ring structure represented by the formula (1) in the structure of the (meth)acrylic resin having a lactone ring structure is at least 5% by weight, then the resin may have sufficient heat resistance, solvent resistance and surface hardness. When the content of the lactone ring structure represented by the formula (1) in the structure of the (meth)acrylic resin having a lactone ring structure is at most 90% by weight, then the resin is excellent in processability.

The (meth)acrylic resin having a lactone ring structure may have any other structure than the lactone ring structure represented by the formula (1). Not specifically defined, the other structure than the lactone ring structure represented by the formula (1) is preferably a polymer structural unit (recurring structural unit) to be constructed through polymerization of at least one selected from (meth)acrylates, hydroxyl group-containing monomers, unsaturated carboxylic acids and monomers represented by the following formula (2a), such as those mentioned hereinunder in the section of the production method for the (meth)acrylic resin having a lactone ring structure.

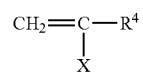
(2a)

wherein $R^4$ represents a hydrogen atom or a methyl group, X represents a hydrogen atom, an alkyl group having from 1 to 20 carbon atoms, an aryl group, a —CN group, a —CO—$R^5$ group, or an —O—CO—$R^6$ group, and $R^5$ and $R^6$ each represents a hydrogen atom or an organic residue having from 1 to 20 carbon atoms.

The content of the other structure than the lactone ring structure represented by the formula (1) in the structure of the (meth)acrylic resin having a lactone ring structure is, in case where the other structure is a polymer structural unit (recurring structural unit) constructed through polymerization of a (meth)acrylate, preferably from 10 to 95% by weight, more preferably from 10 to 90% by weight, even more preferably from 40 to 90% by weight, still more preferably from 50 to 90% by weight; in case where the other structure is a polymer structural unit (recurring structural unit) constructed through polymerization of a hydroxyl group-containing monomer, the content is preferably from 0 to 30% by weight, more preferably from 0 to 20% by weight, even more preferably from 0 to 15% by weight, still more preferably from 0 to 10% by weight; in case where the other structure is a polymer structural unit (recurring structural unit) constructed through polymerization of an unsaturated carboxylic acid, the content is preferably from 0 to 30% by weight, more preferably from 0 to 20% by weight, even more preferably from 0 to 15% by weight, still more preferably from 0 to 10% by weight; in case where the other structure is a polymer structural unit (recurring structural unit) constructed through polymerization of a monomer represented by the formula (2a), the content is preferably from 0 to 30% by weight, more preferably from 0 to 20% by weight, even more preferably from 0 to 15% by weight, still more preferably from 0 to 10% by weight.

The method for producing the (meth)acrylic resin having a lactone ring structure is not specifically defined, for which, for example, employable is any known method of suspension polymerization, emulsion polymerization, bulk polymerization, solution polymerization or the like. Preferably, the (meth)acrylic resin having a lactone ring structure may be produced by polymerizing a specific monomer mentioned below to give a polymer (a) having both a hydroxyl group and an ester group in the molecular chain, and then heat-treating the obtained polymer (a) for lactone cyclization condensation to thereby introduce a lactone ring structure into the polymer. Preferred resin compositions of the lactone ring-having (meth)acrylic resin and the details of the production method for the rein are described in JP-A 2007-316366, 2009-198658 and 2006-171464, and the methods described therein are employable here.

In the polymerization step, a monomer component containing a monomer represented by the following formula (1a) is polymerized to give a polymer having both a hydroxyl group and an ester group in the molecular chain.

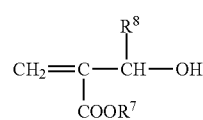
(1a)

wherein $R^7$ and $R^8$ each independently represent a hydrogen atom or an organic residue having from 1 to 20 carbon atoms.

The monomer represented by the formula (1a) includes, for example, methyl 2-(hydroxymethyl)acrylate, ethyl 2-(hydroxymethyl)acrylate, isopropyl 2-(hydroxymethyl)acrylate, normal butyl 2-(hydroxymethyl)acrylate, t-butyl 2-(hydroxymethyl)acrylate. Of those, preferred are methyl 2-(hydroxymethyl)acrylate and ethyl 2-(hydroxymethyl)acrylate, and more preferred is methyl 2-(hydroxymethyl)acrylate from the viewpoint that the heat resistance-enhancing effect of the resin is high. One alone or two or more different types of the monomers of the formula (1a) may be used here either singly or as combined.

The content of the monomer represented by the formula (1a) in the monomer component to be polymerized in the polymerization step is preferably from 5 to 90% by weight, more preferably from 10 to 70% by weight, even more preferably from 10 to 60% by weight, still more preferably from 10 to 50% by weight. When the content of the monomer represented by the formula (1a) in the monomer component to be polymerized in the polymerization step is smaller than 5% by weight, then the resin could not have sufficient heat resistance, solvent resistance and surface hardness. When the content of the monomer represented by the formula (1a) in the monomer component to be polymerized in the polymerization step is at most 90% by weight, then the system would hardly gel in lactone cyclization through polymerization and the processability of the obtained polymer may be good.

The monomer component to be polymerized in the polymerization step may contain any other monomer than the monomer represented by the formula (1a). The other monomer is not specifically defined, and preferred examples thereof include (meth)acrylates, hydroxyl group-containing monomers, unsaturated carboxylic acids and monomers represented by the following formula (2a). One alone or two or more such other monomers than the monomer represented by the formula (1a) may be used here either singly or as combined.

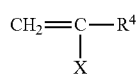

(2a)

wherein $R^4$ represents a hydrogen atom or a methyl group, X represents a hydrogen atom, an alkyl group having from 1 to 20 carbon atoms, an aryl group, a —CN group, a —CO—$R^5$ group, or an —O—CO—$R^6$ group, and $R^5$ and $R^6$ each represents a hydrogen atom or an organic residue having from 1 to 20 carbon atoms.

Not specifically defined, the (meth)acrylates may be any other (meth)acrylates than the monomer represented by the above-mentioned formula (1a), including, for example, acrylates such as methyl acrylate, ethyl acrylate, n-butyl acrylate, isobutyl acrylate, t-butyl acrylate, cyclohexyl acrylate, benzyl acrylate, etc.; methacrylates such s methyl methacrylate, ethyl methacrylate, propyl methacrylate, n-butyl methacrylate, isobutyl methacrylate, t-butyl methacrylate, cyclohexyl methacrylate, benzyl methacrylate, etc. One alone or two or more such (meth)acrylates may be used here either singly or as combined. Of those, especially preferred is methyl methacrylate from the viewpoint that the resin is excellent in heat resistance and transparency.

In case where the other (meth)acrylates than the monomer represented by the formula (1a) are used here, the content thereof to be in the monomer component to be polymerized in the polymerization step is preferably from 10 to 95% by weight, more preferably from 10 to 90% by weight, even more preferably from 40 to 90% by weight, still more preferably from 50 to 90% by weight, from the viewpoint of fully exhibiting the effect of the invention.

Not specifically defined, the hydroxyl group-containing monomers may be any other hydroxyl group-containing monomers than the monomer represented by the formula (1a), including, for example, α-hydroxymethylstyrene, α-hydroxyethylstyrene; 2-(hydroxyalkyl)acrylates such as methyl 2-(hydroxyethyl)acrylate, etc.; 2-(hydroxyalkyl)acrylic acids such as 2-(hydroxyethyl)acrylic acid, etc. One alone or two or more such monomers may be used here either singly or as combined.

In case where the other hydroxyl group-containing monomer than the monomer represented by the formula (1a) is used here, the content thereof to be in the monomer component to be polymerized in the polymerization step is preferably from 0 to 30% by weight, more preferably from 0 to 20% by weight, even more preferably from 0 to 15% by weight, still more preferably from 0 to 10% by weight, from the viewpoint of fully exhibiting the effect of the invention.

The unsaturated carboxylic acids include, for example, acrylic acid, methacrylic acid, crotonic acid, α-substituted acrylic acid, α-substituted methacrylic acid, etc. One alone or two or more of these may be used here either singly or as combined. Of those, preferred are acrylic acid and methacrylic acid from the viewpoint of fully exhibiting the effect of the invention.

In case where the unsaturated carboxylic acid is used here, the content thereof to be in the monomer component to be polymerized in the polymerization step is preferably from 0 to 30% by weight, more preferably from 0 to 20% by weight, even more preferably from 0 to 15% by weight, still more preferably from 0 to 10% by weight, from the viewpoint of fully exhibiting the effect of the invention.

The monomers represented by the above-mentioned formula (2a) include, for example, styrene, vinyltoluene, α-methylstyrene, acrylonitrile, methyl vinyl ketone, ethylene, propylene, vinyl acetate, etc. One alone or two or more of these may be used here either singly or as combined. Of those, preferred are styrene and α-methylstyrene from the viewpoint of fully exhibiting the effect of the invention.

In case where the monomer of the formula (2a) is used here, the content thereof to be in the monomer component to be polymerized in the polymerization step is preferably from 0 to 30% by weight, more preferably from 0 to 20% by weight, even more preferably from 0 to 15% by weight, still more preferably from 0 to 10% by weight, from the viewpoint of fully exhibiting the effect of the invention.

The mode of polymerization of the monomer component to give the polymer having both a hydroxyl group and an ester group in the molecular chain is preferably polymerization using a solvent, more preferably solution polymerization.

In the mode of polymerization using a solvent, the polymerization solvent is not specifically defined. For example, the solvent includes aromatic hydrocarbon solvents such as toluene, xylene, ethylbenzene, etc.; ketone solvents such as methyl ethyl ketone, methyl isobutyl ketone, etc.; ether solvents such as tetrahydrofuran, etc. One alone or two or more of these may be used here either singly or as combined.

In the production method of the invention, the lactone ring-having (meth)acrylic resin is dissolved in an organic solvent and cast in a mode of solution casting film formation to form the intended core layer, in which the organic solvent for use in producing the lactone ring-having (meth)acrylic resin is not limited as in the solution casting film formation, and an organic solvent having a high boiling point may also be used in producing the resin.

In the polymerization reaction, if desired, a polymerization initiator may be used. Not specifically defined, the polymerization initiator includes, for example, organic peroxides such as cumene hydroperoxide, diisopropylbenzene hydroperoxide, di-t-butyl peroxide, lauroyl peroxide, benzoyl peroxide, t-butylperoxyisopropyl carbonate, t-amylperoxy-2-ethyl hexanoate, etc.; azo compounds such as 2,2'-azobis(isobutyronitrile), 1,1'-azobis(cyclohexanecarbonitrile), 2,2'-azobis(2,4-dimethylvaleronitrile), etc. One alone or two or more of these may be used here either singly or as combined. Not specifically defined, the amount of the polymerization initiator to be used may be suitably defined depending on the combination thereof with the monomer to be sued and the reaction condition.

By controlling the amount of the polymerization initiator to be used, the weight-average molecular weight of the polymer to be produced can be controlled.

During the polymerization, preferably, the concentration of the polymer formed in the polymerization reaction mixture is controlled to be at most 50% by weight for the purpose of preventing the reaction liquid from gelling. Concretely, in case where the concentration of the polymer formed in the polymerization reaction mixture is more than 50% by weight, it is desirable that a polymerization solvent is suitably added to the polymerization reaction mixture to thereby control the polymer concentration therein to be at most 50% by weight. More preferably, the concentration of the polymer formed in the polymerization reaction mixture is at most 45% by weight, even more preferably at most 40% by weight.

The mode of suitably adding the polymerization solvent to the polymerization reaction mixture is not specifically defined. The polymerization solvent may be added continuously or intermittently. By controlling the concentration of the polymer formed in the polymerization reaction mixture in that manner, the reaction liquid may be fully prevented from gelling and, in particular, even when the proportion of the hydroxyl group and the ester group in the molecular chain is increased for the purpose of enhancing the heat resistance of the polymer by increasing the lactone ring content therein, the reaction liquid can be fully prevented from gelling. The type of the polymerization solvent to be added may be the same as that of the solvent used in the initial stage of the polymerization, or may be different from the latter; but preferably, the two are the same. The polymerization solvent to be added may be a single solvent alone or may also be a combination of two or more solvents.

In the polymerization reaction mixture obtained at the time at which the polymerization step has finished, in general, the solvent is contained in addition to the obtained polymer; but it is unnecessary to completely remove the solvent and to take out the polymer as a solid. Preferably, the polymer still containing the solvent is introduced into the successive lactone cyclization condensation step. If desired, after the polymer is taken out as a solid, a suitably solvent may be again added thereto in the subsequent lactone cyclization condensation step.

The polymer obtained in the polymerization step is a polymer (a) having both a hydroxyl group and an ester group in the molecular chain, and the weight-average molecular weight of the polymer (a) is, though not specifically defined herein, preferably from 1000 to 2000000, more preferably from 5000 to 1000000, even more preferably from 10000 to 500000, still more preferably from 50000 to 500000. The polymer (a) obtained in the polymerization step is heat-treated in the subsequent lactone cyclization condensation step, whereby a lactone ring structure is introduced into the polymer to give a (meth)acrylic resin having a lactone ring structure.

The reaction to introduce a lactone ring structure into the polymer (a) is not specifically defined. Preferably, the reaction is attained by heating to bring about cyclization condensation between the hydroxyl group and the ester group existing in the molecular chain of the polymer (a), thereby forming the corresponding lactone ring structure. The cyclization condensation gives alcohol as a side product. The lactone ring structure thus formed in the molecular chain of the polymer (in the main skeleton of the polymer) impart high-level heat resistance to the resulting resin. In case where the reaction rate in the cyclization condensation reaction to give the lactone ring structure is insufficient, the heat resistance of the resin could not be enhanced sufficiently, or condensation may occur during shaping owing to the heat treatment for the shaping, or the formed alcohol may exist as bubbles or silver streaks in the shaped article.

The method for heat treatment of the polymer (a) is not specifically defined, for which is employable any known method. For example, the solvent-containing polymerization reaction mixture obtained in the polymerization step may be directly heat-treated. If desired, the mixture may be heat-treated in the presence of a solvent, using a ring-closing catalyst. As the case may be, the heat treatment may be attained in a heating furnace equipped with a vacuum unit or a volatile removal unit for removing the volatile component, or an extruder or the like equipped with a reactor unit or a volatile removal unit.

In the cyclization condensation reaction, if desired, any other thermoplastic resin may be made to present in the system in addition to the polymer (a). Also in the cyclization condensation reaction, if desired, an esterification catalyst or an interesterification catalyst such as p-toluenesulfonic acid or the like that may be generally sued as a catalyst for cyclization condensation reaction may be used; and an organic carboxylic acid such as acetic acid, propionic acid, benzoic acid, acrylic acid, methacrylic acid or the like may be used as a catalyst. As described in JP-A 61-254608 and 61-261303, a basic compound, an organic carboxylic acid salt, a carbonic acid salt or the like may also be used.

In the cyclization condensation reaction, preferably, an organic phosphorus compound is used as the catalyst as in JP-A 2001-151814. Not specifically defined, the amount of the catalyst to be used in the cyclization condensation reaction is preferably from 0.001 to 5% by weight relative to the polymer (a), more preferably from 0.01 to 2.5% by weight, even more preferably from 0.01 to 1% by weight, still more preferably from 0.05 to 0.5% by weight. The time for the addition of the catalyst is not also specifically defined. The catalyst may be added in the initial stage of the reaction, or on the way of the reaction, or in both the two.

The hydroxyl group and the ester group existing in the molecular chain of the polymer (a) obtained in the polymerization step may be pre-treated to thereby increase the cyclization condensation reaction rate thereof in some degree, and thereafter the system is processed for the intended cyclization condensation reaction along with a volatile removal step as in JP-A 2007-316366, and the mode of this process is preferred in producing the (meth)acrylic resin having a lactone ring structure for use in the invention. The mode of this process produces a (meth)acrylic resin having a lactone ring structure that has a higher glass transition temperature and has a higher cyclization condensation reaction rate and is more excellent in heat resistance. In this case, as the indication of the cyclization condensation reaction rate, the weight loss in the dynamic TG measurement of the resin to be mentioned below is at most 2% within a range between 150° C. and 300° C., more preferably at most 1.5%, even more preferably at most 1%. The mode of cyclization condensation reaction combined with a volatile removal step is described in JP-A 2007-316366.

Regarding the heating method, for example, there may be mentioned a method of heating the polymerization reaction mixture obtained in the polymerization step, directly as it is, using a pressure reactor or the like.

Heating of the reaction mixture may be attained under pressure under some condition with no problem at all.

In the pretreatment for cyclization condensation reaction to be attained prior to the cyclization condensation reaction combined with a volatile removal step, a part of the solvent may be spontaneously evaporated during the reaction with no problem at all.

In the case of the mode where the hydroxyl group and the ester group existing in the molecular chain of the polymer (a) obtained in the polymerization step are previously reacted for cyclization condensation to thereby increase the cyclization condensation reaction rate in some degree, and thereafter the system is processed for the intended cyclization condensation reaction along with a volatile removal step, the polymer obtained as a result of the previous cyclization condensation reaction (the polymer in which at least a part of the hydroxyl group and the ester group existing in the molecular chain thereof have been reacted for cyclization condensation) and the solvent may be directly led to the successive cyclization condensation reaction step combined with the vapor removal step; or if desired, after the polymer (the polymer in which at least apart of the hydroxyl group and the ester group existing in the molecular chain thereof have been reacted for cyclization condensation) is processed in any other treatment of once isolating the polymer and again adding a solvent thereto or the like, the polymer may be led to the successive cyclization condensation reaction step combined with the vapor removal step.

As the (meth)acrylic resin having a lactone ring structure for use herein, one having a weight-average molecular weight (this may also be referred to as mass-average molecular weight) of from 10,000 to 3,000,000 may be selected. In the invention, an outer layer of a cellulose acylate is provided on at least one side of the core layer of the lactone ring-having (meth)acrylic resin, and there is no specific limitation on the weight-average molecular weight of the two; however, the weight-average molecular weight thereof may be suitably selected for optimizing the film formation step.

The weight-average molecular weight (Mw) of the acrylic resin for use in the optical film of the invention is preferably at least 80000, more preferably from 80000 to 1000000, even more preferably from 100000 to 600000, still more preferably from 150000 to 400000, from the viewpoint of the nonbrittleness and the self-film formability of the optical film.

The weight-average molecular weight of the acrylic resin may be measured through gel permeation chromatography.

Especially preferably, the acrylic resin for use herein has a weight-average molecular weight of at least 80000 and has a methyl methacrylate unit in an amount of from 50% by mass to 99% by mass.

Preferably, the (meth)acrylic resin having a lactone ring structure has a glass transition temperature (Tg) of not lower than 115° C., more preferably not lower than 125° C., even more preferably not lower than 130° C., still more preferably not lower than 135° C., most preferably not lower than 140° C. When Tg is not lower than 115° C. and, for example, when the film is finally incorporated in a polarizer, the durability of the polarizer could be excellent. Not specifically defined, the uppermost limit of Tg of the (meth)acrylic resin having a lactone ring structure is preferably not higher than 150° C. from the viewpoint of more favorably exhibiting the effect of the invention.

Even though the total amount of the residual volatile contained in the (meth)acrylic resin having a lactone ring structure is large, it causes no specific problem in co-casting in the production method of the invention.

Preferably, the total light transmittance, as measured according to the method of ASTM-D-1003, of the (meth) acrylic resin having a lactone ring structure is at least 85%, more preferably at least 88%, even more preferably at least 90%. The total light transmittance is an indication of transparency, and when it is less than 85%, then the transparency of the film is low and the film could not be used for intended purpose of the invention.

The (meth)acrylic resin having a lactone ring structure may be produced according to ordinary chemical synthesis. For example, it may be produced according to the method described in JP-A 2007-316366. Two or more different types of the (meth)acrylic resin having a lactone ring structures may be used here as combined.

(Other Thermoplastic Resin Optionally in Core Layer)

The core layer in the invention may contain any other thermoplastic resin than the above-mentioned, (meth)acrylic resin having a lactone ring structure. The type of the other thermoplastic resin is not specifically defined, and the resin may be any one which, when blended with the above-mentioned, (meth)acrylic resin having a lactone ring structure and formed into a film, could secure the properties of a glass transition temperature of not lower than 120° C., an in-plane retardation per 100 μm of at most 20 nm, and a total light transmittance of at least 85%, but is preferably a thermoplastic resin that is thermodynamically compatible with the (meth)acrylic resin, from the viewpoint of enhancing the transparency and the mechanical strength of the film.

The other thermoplastic resin includes, for example, olefinic polymers such as polyethylene, polypropylene, ethylene/propylene copolymer, poly(4-methyl-1-pentene), etc.; halogenopolymers such as polyvinyl chloride, vinyl chloride resin, etc.; acrylic polymer such as methyl polymethacrylate; styrenic polymers such as polystyrene, styrene-methyl methacrylate copolymer, styrene/acrylonitrile copolymer, acrylonitrile/butadiene/styrene block copolymer, etc.; polyesters such as polyethylene terephthalate, polybutylene terephthalate, polyethylene naphthalate, etc.; polyamides such as nylon 6, nylon 66, nylon 610, etc.; polyacetals; polycarbonates; polyphenylene oxides; polyphenylene sulfides; polyether ether ketones; polysulfones; polyether sulfones; polyoxybenzylenes; polyamidimides; rubbery polymers such as ABS resins or ASA resins mixed with polybutadiene rubber, acrylic rubber, etc. The rubbery polymer preferably has a graft moiety having a composition miscible with the cyclic polymer such as the polymer having a lacton ring in the invention, in the surface thereof, and more preferably the mean particle size of the rubbery polymer is at most 100 nm, even more preferably at most 70 nm from the viewpoint of increasing the transparency of the formed film.

As the thermoplastic resin that is thermodynamically compatible with the (meth)acrylic resin having a lactone ring structure, preferred is a copolymer containing a vinyl cyanide monomer unit and an aromatic vinyl monomer unit, concretely including an acrylonitrile/styrene copolymer, a polyvinyl chloride resin, and a polymer containing a methacrylate in an amount of at least 50% by weight. Of those, more preferred is use of an acrylonitrile/styrene copolymer as facilitating the formation of the core layer having a glass transition temperature of not lower than 120° C., an in-plane retardation per 100 μm of at most 20 nm, and a total light transmittance of at least 85%.

In case where the core layer in the invention contains the above-mentioned other thermoplastic resin, the ratio of the (meth)acrylic resin having a lactone ring structure to the other thermoplastic resin is preferably from (60 to 99)/(1 to 40) % by weight, more preferably from (70 to 97)/(3 to 30) % by weight, even more preferably from (80 to 95)/(5/20) % by weight.

(Residual Solvent Amount)

Preferably, the film of the invention is produced through co-casting according to the production method of the invention to be mentioned below. The core layer thus formed through solution casting film formation and containing the (meth)acrylic resin having a lactone ring structure may be effective for bettering the surface condition of the outer layer to be formed thereon, as compared with the other case of forming the (meth)acrylic resin having a lactone ring structure layer according to a melt casting film formation method.

<Outer Layer>

Next described is the outer layer of the film of the invention.

The film of the invention has a thickness of from more than 3 μm to 20 μm, and has an outer layer containing a cellulose acylate.

(Thickness)

The preferred embodiment of the thickness of the outer layer is described in the section of the description of the layer configuration in the invention given hereinabove.

(Type of Cellulose Acylate)

The cellulose acylate resin for use in the invention is not specifically defined. The starting cellulose includes cotton linter and wood pulp (hardwood pulp, softwood pulp), etc.; and any cellulose acylate resin obtained from any starting cellulose can be used herein. As the case may be, different starting celluloses may be mixed for use herein. The starting cellulose materials are described in detail, for example, in Marusawa & Uda's "Plastic Material Lecture (17), Cellulosic Resin" (by Nikkan Kogyo Shinbun, 1970), and in Hatsumei Kyokai Disclosure Bulletin No. 2001-1745, pp. 7-8.

(Degree of Acyl Substitution of Cellulose Acylate)

Preferably, the cellulose acylate for use in the invention has a total degree of substitution with acyl group of from 1.2 to 3.0.

Preferably, the cellulose acylate resin for use in the invention satisfies the following conditions where TA-Total means the total degree of substitution with acyl group, TA2 means the degree of substitution with acyl group having 2 carbon atoms, and TA3 means the degree of substitution with acyl group having from 3 to 7 carbon atoms. Satisfying the following conditions, there can be obtained an optical film excellent in point of the adhesiveness thereof to neighboring layers, the drum releasability thereof, and the curling resistance thereof.

$$2.2 \leq TA\text{-Total} \leq 3.0$$

$$1.5 \leq TA2 \leq 3.0$$

$$0.0 \leq TA3 \leq 0.7$$

More preferably, the cellulose acylate resin satisfies the following conditions:

$$2.5 \leq TA\text{-Total} \leq 3.0$$

$$2.4 \leq TA2 \leq 3.0$$

$$0.0 \leq TA3 \leq 0.1$$

Especially preferably, the cellulose acylate resin for use in the invention is at least one selected from cellulose acetate, cellulose acetate propionate, cellulose acetate butyrate, cellulose acetate benzoate, cellulose propionate, cellulose butyrate. Of those, more preferred as the cellulose acylate resin are cellulose acetate and cellulose acetate propionate; and even more preferred is triacetyl cellulose.

The degree of substitution with acetyl group and the degree of substitution with other acyl group may be determined according to the method defined in ASTM-D817-96.

The weight-average molecular weight (Mw) of the cellulose acylate resin for use in the invention is preferably at least 75000, more preferably within a range of from 75000 to 300000, even more preferably from 100000 to 240000, still more preferably from 160000 to 240000. When the weight-average molecular weight (Mw) of the cellulose acylate resin is at least 75000, then the cellulose acylate resin of the type can favorably exhibit its self-film formability and good adhesiveness. In the invention, two or more different types of cellulose acylate resins may be used as combined.

(Other Resin in Cellulose Acylate Layer)

In the invention, an acrylic resin may be added to the cellulose acylate layer. The proportion of the acrylic resin to the cellulose acylate in the layer is preferably from 2 to 140% by mass, based on the cellulose acylate, more preferably from 4 to 100% by mass, most preferably from 6 to 60% by mass. Preferably, the molecular weight of the acrylic resin is from 1000 to 200,000, more preferably from 1000 to 100,000, most preferably from 1500 to 50,000, especially preferably from 1500 to 10,000. When the molecular weight of the resin falls within the range, the cellulose acylate layer could be excellent in transparency.

<Additive>

In each of the core layer and the outer layer of the optical film of the invention, any other additive than the above-mentioned photoelastic coefficient reducing agent may be incorporated along with the main ingredient therein of one or more thermoplastic resins, not contradictory to the object and the sprit of the invention.

The additives that may be added to the optical film of the invention are described below.

(Plasticizer)

In the invention, a plasticizer may be added to the optical film of the invention for making the film soft, enhancing the dimensional stability of the film and enhancing the moisture resistance of the film.

As the plasticizer preferred for use herein, there may be mentioned low-molecular to oligomer compounds having the above-mentioned physical properties and having a molecular weight of from 190 to 5000 or so, for example, phosphates, carboxylates, polyol esters, etc.

Examples of the phosphates include triphenyl phosphate (TPP), tricresyl phosphate, cresyl diphenyl phosphate, octyl diphenyl phosphate, biphenyl diphenyl phosphate, trioctyl phosphate, tributyl phosphate, etc. Preferred are triphenyl phosphate, biphenyl diphenyl phosphate.

The carboxylates typically include phthalates and citrates. Examples of the phthalates include dimethyl phthalate, diethyl phthalate, dibutyl phthalate, dioctyl phthalate, diphenyl phthalate, diethylhexyl phthalate, etc. Examples of the citrates include triethyl O-acetylcitrate, tributyl O-acetylcitrate, acetyltriethyl citrate, acetyltributyl citrate, etc.

These preferred plasticizers are liquid at 25° C., except TPP (having a melting point of about 50° C.), and have a boiling point of not lower than 250° C.

Examples or the other carboxylates include butyl oleate, methylacetyl ricinoleate, dibutyl sebacate, various trimellitates, etc. Examples of the glycolates include triacetin, tributyrin, butylphthalylbutyl glycolate, ethylphthalylethyl glycolate, methylphthalylethyl glycolate, butylphthalylbutyl glycolate, methylphthalylmethyl glycolate, propylphthalylpropyl glycolate, butylphthalylbutyl glycolate, octylphthalyloctyl glycolate, etc.

Plasticizers described in JP-A 5-194788, 60-250053, 4-227941, 6-16869, 5-271471, 7-286068, 5-5047, 11-80381, 7-20317, 8-57879, 10-152568, 10-120824 are also preferably used here. These patent publications disclose not only examples of the plasticizers but also various methods of using them and characteristics of the plasticizers; and the disclosure may be favorably referred to in the present invention.

As plasticizers also favorably usable here are (di)pentaerythritol esters described in JP-A 11-124445; glycerol esters described in JP-A 11-246704; diglycerol esters described in JP-A 2000-63560; citrates described in JP-A 11-92574; substituted phenyl phosphates described in JP-A 11-90946; ester compounds having an aromatic ring and a cyclohexane ring described in JP-A 2003-165868, etc.

Also preferred for use herein is a polymer plasticizer containing a resin component having a molecular weight of from 1000 to 100,000. For example, there may be mentioned polyesters and polyethers described in JP-A 2002-22956; polyester ethers, polyester urethanes or polyesters described in JP-A 5-197073; copolyester ethers described in JP-A2-292342; epoxy resins or novolak resins described in JP-A 2002-146044, etc.

As the plasticizer excellent in vaporization resistance, bleeding out resistance and low haze, for example, also preferred for use herein are polyester diols terminated with a hydroxyl group at both ends thereof, described in JP-A 2009-98674. As the plasticizer excellent in imparting good surface planarity and the low haze to optical film, preferred are sugar ester derivatives described in WO2009/031464.

One alone or two or more of these plasticizers may be used here either singly or as combined. The amount of the plasticizer to be added may be generally from 2 to 120 parts by mass relative to 100 parts by mass of the thermoplastic resin, preferably from 2 to 70 parts by mass, more preferably from 2 to 30 parts by mass, even more preferably from 5 to 20 parts by mass. Using the same plasticizer in the two neighboring layers of the outer layer dope (A) and the core layer dope (B) for use in the production method of the invention to be mentioned below is favorable from the viewpoint that the interface between the dopes in casting can be prevented from being disordered, the interfacial adhesiveness may be bettered and the curling resistance of the formed film may be bettered. Especially preferably, the outer layer dope (A) and the core layer dope (b) contain the same plasticizer.

(UV Absorbent)

The optical film of the invention may further contain a UV absorbent for the purpose of enhancing the lightfastness of the film itself, or for the purpose of preventing the deterioration of the image display parts such as polarizers or liquid crystal compounds in liquid crystal display devices, etc.

Preferably, the UV absorbent for use herein is excellent in the ability to absorb UV rays having a wavelength of at most 370 nm from the viewpoint of preventing the degradation of liquid crystal, and absorbs as little as possible the visible light having a wavelength of at least 400 nm from the viewpoint of securing good image display capability. More preferably, the UV absorbent has a transmittance at a wavelength of 370 nm of at most 20%, even more preferably at most 10%, still more preferably at most 5%. The UV absorbent of the type includes, for example, oxybenzophenone compounds, benzotriazole compounds, salicylate compounds, benzophenone compounds, cyanoacrylate compounds, nickel complex compounds, UV absorbent group-having polymer UV absorbent compounds such as those mentioned above, etc., to which, however, the invention should not be limited. Two or more different types of UV absorbents may be used here as combined.

The film of the invention may contain an additive along with the main ingredient therein of one or more thermoplastic resins. Examples of the additive include fluorosurfactant (its preferred amount is from 0.001 to 1% by mass relative to the thermoplastic resin), release agent (from 0.0001 to 1% by mass), antioxidant (from 0.0001 to 1% by mass), optical anisotropy regulator (from 0.01 to 10% by mass), IR absorbent (from 0.001 to 1% by mass), etc.

The optical film of the invention may contain a trace of particles of an organic material, an inorganic material or their mixture, as dispersed therein within a range not detracting from the effect of the invention. In case where the particles are used for the purpose of enhancing the travelability of film in film formation (that is, as a mat agent), the particle size of the particles is preferably from 5 to 3000 nm, and the amount thereof is preferably at most 1% by mass.

The particles may be added for roughening the surface of the film or for making the film have internal light scatterability, and in such a case, the particle size of the particles is preferably from 1 to 20 µm, and the amount thereof is preferably from 2 to 30% by mass. Preferably, the difference in the refractive index between the particles and the polymer film of the invention is from 0 to 0.5; and for example, in case where particles of an inorganic material are used, they may include particles of silicon oxide, aluminium oxide, barium oxide, etc. Examples of the particles of an organic material include acrylic resin, divinylbenzene resin, benzoguanamine resin, styrene resin, melamine resin, acryl-styrene resin, polycarbonate resin, polyethylene resin, polyvinyl chloride resin, etc.

<Lamination of Additional Layer onto Optical Film>

The optical film of the invention may additionally have, as formed thereon, a curable resin layer having a thickness of from 0.1 µm to 15 µm. In addition, any other optically-functional layer such as antistatic layer, high-refractivity layer, low-refractivity layer or the like may be further formed on the curable resin layer. As the case may be, the curable resin layer may serve also as an antistatic layer or a high-refractivity layer.

The curable resin layer is preferably formed through crosslinking reaction or polymerization reaction of an ionizing radiation-curable compound. For example, a coating composition that contains an ionizing radiation-curable polyfunctional monomer or polyfunctional oligomer may be applied onto the light-transmissive substrate, and the polyfunctional monomer or the polyfunctional oligomer may be crosslinked or polymerized to form the intended layer.

The functional group of the ionizing radiation-curable polyfunctional monomer or polyfunctional oligomer is preferably one capable of polymerizing with light, electron beams or radiations, more preferably a photopolymerizing functional group.

The photopolymerizing group includes unsaturated polymerizing functional groups such as (meth)acryloyl group, vinyl group, styryl group, allyl group, etc.; and above all, preferred is a (meth)acryloyl group.

The curable resin layer may contain any known additive such as leveling agent, antifouling agent, antistatic agent, refractive index-controlling inorganic filler, scattering particles, thixotropic agent, etc.

The strength of the optical film having the curable resin layer formed thereon is preferably at least H in a pencil hardness test, more preferably at least 2H.

<Film Properties>
(Photoelastic Coefficient)

The photoelastic coefficient is the property inherent in a substance; and rather few substances could express the photoelastic coefficient thereof. For example, most polymer resins express birefringence owing to external stress or thermal stress given thereto. The sign of the photoelastic coefficient may be defined in relation to the direction of the applied stress. Specifically, in case where a tensile stress is given to a medium (polymer resin), the sign of the photoelastic coefficient of the medium can be expressed as plus or minus of the photoelastic coefficient c represented by the following formula (1B), relative to the refractive index $n_{para}$ to the polarized light having a polarization plane in the direction parallel to the tensile stress, and the refractive index $n_{perp}$ to the polarized light having a polarization plane in the direction perpendicular to that parallel direction.

$$c = \Delta n/\sigma = (n_{para} - n_{perp})/\sigma \quad (1B)$$

In other words, in case where $n_{para}$ is larger than $n_{perp}$, the photoelastic coefficient is plus, but in case where the former is smaller than the latter, the photoelastic coefficient is minus.

In case where the optical film is used as a protective film for polarizer, the birefringence (Re, Rth) thereof may vary depending on the stress or the like owing to the shrinkage of the polarizing element. The birefringence change owing to such stress may be determined as the photoelastic coefficient, and its range is preferably from $-3\times10^{-12}$ Pa$^{-1}$ to $3\times10^{-12}$ Pa$^{-1}$, more preferably from $-1\times10^{-12}$ Pa$^{-1}$ to $1\times10^{-12}$ Pa$^{-1}$.

Controlling the photoelastic coefficient to fall within the range makes it possible to prevent "thermal unevenness" of the film that may occur when the panel comprising the film is tested in a wet heat endurance test.

(Retardation)

In this description, Re($\lambda$) and Rth($\lambda$) each mean the in-plane retardation and the thickness-direction retardation of the film at a wavelength of $\lambda$. In this description, the wavelength $\lambda$ is 532 nm unless otherwise specifically indicated. Re($\lambda$) is measured by applying a light having a wavelength of $\lambda$ nm in the normal direction of the film, using KOBRA-21ADH or WR (by Oji Scientific Instruments). In selecting the measurement wavelength $\lambda$ nm, a wavelength selection filter may be exchanged by manual, or the measured data may be converted according to the corresponding program or the like.

In this description, Re and Rth (unit: nm) are determined as follows: The film is conditioned at 25° C. and at a relative humidity of 60% for 24 hours. Then, using a prism coupler (MODEL 2010 Prism Coupler, by Metricon) and using a solid 532-nm laser at 25° C. and at a relative humidity of 60%, the mean refractive index (n) of the film is determined according to the following formula (10):

$$n = (nTE \times 2 + nTM)/3 \quad (10)$$

wherein nTE means the refractive index of the film measured with polarized light in the in-plane direction thereof; and nTM is the refractive index of the film measured with polarized light in the normal direction thereof.

When the film to be analyzed is represented by a monoaxial or biaxial index ellipsoid, then its Rth ($\lambda$) may be computed according to the method mentioned below.

Rth ($\lambda$) is determined as follows: With the in-plane slow axis (determined by KOBRA 21ADH or WR) taken as the tilt axis (rotation axis) of the film (in case where the film has no slow axis, the rotation axis of the film may be in any in-plane direction of the film), Re ($\lambda$) of the film is measured at 6 points in all thereof, from the normal direction of the film up to 50 degrees on one side relative to the normal direction thereof at intervals of 10°, by applying a light having a wavelength of $\lambda$ nm from the tilted direction of the film. Based on the thus-determined retardation data of Re ($\lambda$), the assumptive mean refractive index and the inputted film thickness, Rth ($\lambda$) of the film is computed with KOBRA 21ADH or WR.

In the above, with the in-plane slow axis from the normal direction taken as the rotation axis thereof, when the film has a zero retardation value at a certain tilt angle, then the symbol of the retardation value of the film at a tilt angle larger than that tilt angle is changed to a negative one, and then applied to KOBRA 21ADH or WR for computation.

With the slow axis taken as the tilt axis (rotation axis) (in case where the film has no slow axis, the rotation axis of the film may be in any in-plane direction of the film), the retardation values of the film are measured in any tilted two directions; and based on the data, the assumptive mean refractive index and the inputted film thickness, Rth may be computed according to the following formulae (11) and (12):

$$Re(\theta) = \left[ nx - \frac{ny \times nz}{\sqrt{\left\{ny\sin\left(\sin^{-1}\left(\frac{\sin(-\theta)}{nx}\right)\right)\right\}^2 + \left\{nz\cos\left(\sin^{-1}\left(\frac{\sin(-\theta)}{nx}\right)\right)\right\}^2}} \right] \times \frac{d}{\cos\left\{\sin^{-1}\left(\frac{\sin(-\theta)}{nx}\right)\right\}} \quad (11)$$

wherein Re($\theta$) means the retardation value of the film in the direction titled by an angle $\theta$ from the normal direction.

In the formula (11), nx means the in-plane refractive index of the film in the slow axis direction; ny means the in-plane refractive index of the film in the direction vertical to nx; nz means the refractive index of the film vertical to nx and ny; and d means the film thickness.

$$Rth = ((nx+ny)/2 - nz) \times d. \quad (12)$$

When the film to be analyzed could not be represented by a monoaxial or biaxial index ellipsoid, or that is, when the film does not have an optical axis, then its Rth($\lambda$) may be computed according to the method mentioned below.

With the in-plane slow axis (determined by KOBRA 21ADH or WR) taken as the tilt axis (rotation axis) of the film, Re ($\lambda$) of the film is measured at 11 points in all thereof, from $-50°$ to $+50°$ relative to the normal direction of the film at intervals of 10°, by applying a light having a wavelength of $\lambda$ nm from the tilted direction of the film. Based on the thus-determined retardation data Re ($\lambda$), the assumptive mean refractive index and the inputted film thickness, Rth ($\lambda$) of the film is computed with KOBRA 21ADH or WR.

In this, for the assumptive mean refractive index, referred to are the data in Polymer Handbook (John Wiley & Sons, Inc.) or the data in the catalogues of various optical films. Films of which the mean refractive index is unknown may be analyzed with an Abbe's refractometer to measure the mean refractive index thereof. Data of the mean refractive index of some typical optical films are mentioned below. Cellulose acylate (1.48), cycloolefin polymer (1.52), polycarbonate (1.59), polymethyl methacrylate (1.49), polystyrene (1.59). With the assumptive mean refractive index and the film thickness inputted thereinto, Kobra 21ADH or WR can compute nx, ny and nz. From the thus-computed data nx, ny and nz, Nz=(nx−nz)/(nx−ny) is induced.

In the invention, the humidity dependence of Re (ΔRe) and the humidity dependence of Rth (ΔRth) are computed according to the following formulae, based on the in-plane and thickness-direction retardation values at a relative humidity of H (unit, %), Re (H %) and Rth (H %):

ΔRe=Re(10%)−Re(80%)[nm]

ΔRth=Rth(10%)−Rth(80%)[nm]

Re (H %) and Rth (H %) are the retardation values of the film that has been conditioned at 25° C. and at a relative humidity of H % for 24 hours, and the values thereof are measured and computed according to the same methods as above, at 25° C. and at a relative humidity of H % and at a measurement wavelength of 590 nm. A mere expression Re with no indication relating to the relative humidity means the value of retardation measured at a relative humidity of 60%.

More preferably, the retardation values of the optical film as measured at different humidity satisfy the following relational formulae.

|ΔRE|<8 nm, and |ΔRth|<8 nm;

even more preferably,

|ΔRe|<5 nm, and |ΔRth|<5 nm;

still more preferably,

|ΔRe|<3 nm, and |ΔRth|<3 nm.

Controlling the retardation values of the film at different humidity in the manner as above makes it possible to reduce the retardation change of the film in varying external environments and therefore makes it possible to provide high-reliability liquid crystal display devices comprising the film.

Reducing the ΔRth of the optical film of the invention may bring about a favorable effect that, when the film is incorporated in a liquid crystal display device, a problem of circular color unevenness (display unevenness) that may be seen in watching the device obliquely on the display panel thereof under a specific condition could be solved.

[Method for Producing Optical Film of the Invention]

The method for producing the optical film of the invention (hereinafter this may be referred to as the production method of the invention) comprises a step of casting a dope (A) containing a cellulose acylate and an organic solvent and a dope (B) containing a (meth)acrylic resin having a lactone ring structure and an organic solvent onto a casting substrate simultaneously in the order of (A)-(B) from the casting substrate side according to a co-casting process, and a step of removing the organic solvent, wherein the casting thickness of the dope (A) is so controlled that the dry thickness of the dope (A) could be from more than 3 μm to 20 μm.

Preferred embodiments of the production method of the invention are described below.

(Method of Film Formation)

The method of forming the optical film of the invention includes various known film formation methods such as a solution casting method, a melt extrusion method, a calendering method, a compression molding method, etc. Of those, a solution casting method is preferred as the production method of the invention, in which the film of the invention can be produced with good producibility.

<Preparation of Dope>

Regarding the preparation of the solution (dope) of a thermoplastic resin for use in the optical film of the invention, the dissolution method includes a room temperature dissolution method, a cooling dissolution method or a high-temperature dissolution method, or a combination of any of these methods. Regarding these, methods for preparing cellulose acylate solution are described, for example, in JP-A 5-163301, 61-106628, 58-127737, 9-95544, 10-95854, 10-45950, 2000-53784, 11-322946, 11-322947, 2-276830, 2000-273239, 11-71463, 04-259511, 2000-273184, 11-323017, 11-302388, etc. The techniques of the dissolution methods for cellulose acylate in organic solvent disclosed in these are applicable to the thermoplastic resin in the invention. The details of the methods, especially the non-chlorine solvents for use therein are described in detail in the above-mentioned Disclosure Bulletin No. 2001-1745, pp. 22-25. The dope solution of thermoplastic resin is generally concentrated and filtered, which is also described in detail in Disclosure Bulletin No. 2001-1745, p. 25. In dissolution at high temperature, the system is at a temperature not lower than the boiling point of the organic solvent used inmost cases, and in such a case, the system is kept under pressure.

(Organic Solvent)

In the production method of the invention, the organic solvents that dissolve the cellulose acylate and the (meth)acrylate resin having a lactone ring to form the dope in the invention are described. Any known organic solvent may be used as the organic solvent, and, for example, preferred are those having a solubility parameter of from 17 to 22. The solubility parameter is described, for example, in J. Brandrup, E. H. et al., "Polymer Handbook (4th Edition)", VII/671 to VII/714. There may be mentioned lower aliphatic hydrocarbon chlorides, lower aliphatic alcohols, ketones having from 3 to 12 carbon atoms, esters having from 3 to 12 carbon atoms, ethers having from 3 to 12 carbon atoms, aliphatic hydrocarbons having from 5 to 8 carbon atoms, aromatic hydrocarbons having from 6 to 12 carbon atoms, fluoroalcohols (e.g., compounds described in JP-A8-143709, paragraph [0020], 11-60807, paragraph [0037]), etc.

The solvent may be used here singly, but preferred is use of a mixture of a good solvent and a poor solvent for securing good surface condition stability of the film. More preferably, the blend ratio of the good solvent and the poor solvent is such that the proportion of the good solvent is from 60 to 99% by mass and that of the poor solvent is from 40 to 1% by mass. In the invention, the good solvent means a solvent capable of dissolving the resin for use herein by itself; and the poor solvent means a solvent that could not swell or dissolve the resin by itself. The good solvent for use in the invention includes organic halogen compounds such as methylene chloride, etc.; and dioxolans. As the poor solvent for use in the invention, for example, preferred are methanol, ethanol, n-butanol, cyclohexane, etc.

Preferably, the proportion of the alcohol in the organic solvent to be contained in the dopes (A) and (B) is from 10 to 50% by mass of the entire organic solvent from the viewpoint of shortening the drying time on the support (casting substrate) after film formation to thereby rapidly peel off the formed film and dry it, more preferably from 15 to 30% by mass.

(Solid Concentration in Dope)

Preferably, the material to form the optical film of the invention is dissolved in an organic solvent in a solid concentration (sum of the ingredients to be solid after drying) of from 10 to 60% by mass, more preferably from 10 to 50% by mass. In case where a cellulose acylate resin is the main ingredient, preferably, it is dissolved in an amount of from 10 to 30% by mass, more preferably from 15 to 25% by mass, most preferably from 18 to 20% by mass. However, depending on the use of the film, the content of the organic solvent may be reduced, and for the reason of shortening the drying time, the solid concentration in the dope (A) may be favorably from more than 20% by mass to 22% by mass, as the case may be. Regarding the method of controlling the solid concentration, the ingredient may be so controlled as to have a predetermined solid concentration in the stage of dissolving it, or a low-concentration solution (for example, having a concentration of from 9 to 14% by mass) is previously prepared, and this may be concentrated in the next concentration step to prepare a high-concentration solution. Further, a high-concentration solution to form a light-transmissive material is previously formed, and then various additives may be added thereto to lower the concentration of the resulting solution to a predetermined level.

For attaining the support releasability, the interfacial adhesiveness and the curling resistance of the film, to which the invention is directed, at least the composition of the thermoplastic resin in the dopes (A) and (B) preferably satisfies the following condition. The proportion of the cellulose acylate resin in the thermoplastic resin in the dope (A) is preferably from 50 to 100% by mass, more preferably from 70 to 100% by mass, most preferably from 80 to 100% by mass. The proportion of the acrylic resin in the thermoplastic resin in the dope (B) is preferably from 30 to 100% by mass, more preferably from 50 to 100% by mass, most preferably from 70 to 100% by mass.

On the other hand, for obtaining a film having a good surface condition through co-casting film formation, preferably, the difference in the solid concentration between the dope (B) and the dope (A) is at most 10% by mass, more preferably at most 5% by mass.

In particular, it is desirable that the solid concentration in the dope (B) is from 16 to 30% by mass and the difference in the solid concentration between the dope (B) and the dope (A) is at most 10% by mass.

(Complex Viscosity of Dope)

In the production method of the invention, preferably, at 25° C., the complex viscosity $\eta_A$ of the dope (A) and the complex viscosity $\eta_B$ of the dope (B) are so controlled as to satisfy the relation of the following formula (1)

$$\eta_A \leq \eta_B \quad (I)$$

In the production method of the invention, it is especially desirable that the complex viscosity of the dope (A) and the dope (B) each is from 10 to 80 Pa·s and the complex viscosity of the dope (B) is larger than the complex viscosity of the dope (A) from the viewpoint of bettering the film surface condition after film formation.

In the production method of the invention, preferably, the complex viscosity of the dope (A) and the dope (B) each is from 10 to 80 Pa·s. The complex viscosity falling within the range is favorable since the solution casting aptitude of the dope is further bettered. The complex viscosity of the dope in the invention is the viscosity thereof measured with a fluid shear rheometer.

More preferably, the complex viscosity is from 20 to 80 Pa·s, even more preferably from 25 to 70 Pa·s. The viscosity was measured as follows: One mL of the sample solution was put into a rheometer (CLS 500), and analyzed with Steel Cone having a diameter of 4 cm/2° (both by TA Instruments).

The sample solution was previously warmed until its temperature became constant at the measurement start temperature, and then the measurement was started. The temperature at the start of the test is not specifically defined so far as it is the casting temperature. Preferably, the temperature is from −5 to 70° C., more preferably from −5 to 35° C. In the invention, the value at 25° C. is used as stated above.

<Co-Casting Step>

(Casting)

The production method of the invention includes a step of casting a dope (A) containing a cellulose acylate and an organic solvent and a dope (B) containing a (meth)acrylic resin having a lactone ring structure and an organic solvent onto a casting substrate simultaneously in the order of (A)-(B) from the casting substrate side according to a co-casting process.

Further, in the production method of the invention, the casting thickness of the dope (A) is so controlled that the dry thickness of the dope (A) could be from more than 3 µm to 20 µm. Not specifically defined, any known method is employable for controlling the casting thickness. A more preferred range of the dry thickness is the same as the preferred range of the outer layer of the optical film of the invention.

The dope is cast onto a support and the solvent is evaporated away to form a film thereon. In this, the support is not specifically defined but is preferably a drum or a band. The surface of the support is preferably finished in a mirror state. The casting and drying modes in a solvent casting method are described in U.S. Pat. Nos. 2,336,310, 2,367,603, 2,492,078, 2,492,977, 2,492,978, 2,607,704, 2,739,069, 2,739,070; British Patent 640731, 736892; JP-B 45-4554, 49-5614; JP-A 60-176834, 60-203430, 62-115035.

FIG. 1 is a schematic view showing the substantial part of a casting apparatus having a band, and is a plane view taken from the side thereof. The casting apparatus 11 comprises a casting die 14, first and second backup rollers 32 and 33, a band 31, a peeling roller 37, a temperature-controlling plate 51, plural condenser plates 52, plural liquid receivers 53, a collector tank 56, and a liquid feeding duct. Three types of dopes are prepared as the casting dope 12, and these may be cast in one casting operation to form a three-layer cast film. PS means the casting start point. 36 means the formed film.

Figure 2:
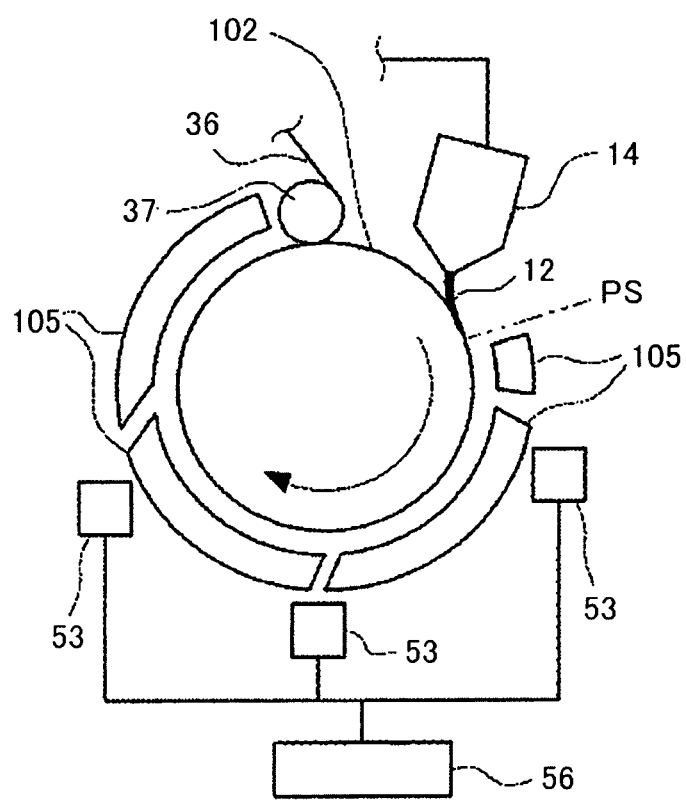
FIG. 2 is a graphical view showing one example of a drum casting apparatus.

FIG. 2 is a view showing a casting apparatus having a drum. FIG. 2 is a schematic view showing the substantial part of the casting apparatus 101, and is a plane view taken from the side thereof. In FIG. 2, the same reference numbers are given to the same unit and the part as in the above-mentioned FIG. 1, and their description is omitted here. In FIG. 2, a drum 102 is used in place of the band in FIG. 1. The casting dope 12 from the casting die 14 is cast at a relatively lower position than the top of the drum 102, so that the cast film formed on the drum 102 could run downward from the casting start point PS. In this case, preferably, the casting start point PS is so positioned that the tangent line at the casting start point on the drum 102 could be identical as much as possible to the tangent line of the casting curve from the casting die 14.

The drum 102 has a temperature-controlling function. Outside the cast film, plural condenser plates 105 are arranged, and the condensed liquid runs along the inclination between the condenser plates 105 and is led into the external liquid receiver 53 and is then collected in the collector tank 56. The cast film running on the drum 102 is peeled by the peeling roller 37 to be a film 36, which is then fed to a drying zone in the next step. Accordingly, with preventing liquid dripping, the cast film can be uniformly dried and the solvent can be recovered at high yield. However, even when the rotating direction of the drum 102 is reversed and the running direction of the cast film is made upward from the casting start point PS, uniform drying of the cast film can be secured and the thickness of the film 36 can be kept uniform.

Preferably, the dope is cast onto the support having a surface temperature of not higher than 5° C. The surface temperature of the casting substrate (support) is preferably from −30 to 5° C., more preferably from −10 to 2° C.

Preferably, the cast film is dried by exposing it to air for at least 2 seconds after the casting. The formed film is peeled away from the support, and may be dried at high-temperature air of which the temperature is successively changed from 100° C. to 160° C., to thereby evaporate the residual solvent. The method is described in JP-B 5-17844. According to the method, the time from casting to peeling may be shortened. For carrying out the method, the dope must gel at the surface temperature of the support on which it is cast.

In the invention, at least the above-mentioned two types of dopes are cast on a support of a casting substrate for film formation thereon. In the film production method of the invention, nothing is limited other than the above, and any known co-casting method is employable. For example, the dope solutions may be individually cast from plural casting mouths arranged in the metal support running direction at some intervals and laminated to form a film, and for example, the methods described in JP-A 61-158414, 1-122419, 11-198285 are employable. The film may also be formed by casting the dope solutions from two casting mouths, and for example, the methods described in JP-B 60-27562, JP-A 61-94724, 61-947245, 61-104813, 61-158413, 6-134933 are employable.

In the production method of the invention, preferably, at least two types of the dopes (A) and (B) are simultaneously co-cast onto the casting substrate in order from the casting substrate side from the viewpoint of bettering the interfacial adhesiveness of the laminate and reducing the curling thereof. More preferably, in the production method of the invention, the dopes (A), (B) and (A) are simultaneously co-cast onto the support in that order from the support side. The compositions of the plural (A)'s in one laminate film may be completely the same or different.

<Drying Step>

The production method of the invention includes a step of removing the organic solvent.

A method of drying the web that has been dried on the drum or band and has been peeled away is described. The web that has been peeled at the peeling position at which just before the drum or belt goes into a 360-degree roll with the web thereon is then conveyed, according to a method of conveying it alternately through zigzag-arranged rolls, a method of contactlessly conveying the web while both sides of the web are held with clips or the like, etc. The web (film) may be dried according to a method of applying air at a predetermined temperature to both surfaces of the web being conveyed, or a method of heating the web with a heating means such as microwaves, etc. Too rapid drying is unfavorable as probably detracting from the surface planarity of the formed film. Accordingly, it is desirable that, in the initial stage of drying, the web is dried at a temperature at which the solvent does not foam, and after dried in some degree, the web is further dried at a high temperature. In the drying step after the film has been peeled away from the support, the film shrinks in the machine direction or in the cross direction owing to the solvent evaporation. The degree of shrinkage may be larger when the film is dried at a higher temperature. It is desirable that the film is dried while its shrinkage is retarded as much as possible, from the viewpoint of bettering the surface planarity of the formed film. From this viewpoint, for example, preferred is a method (tenter method) of drying the web while both sides of the web are held with clips or pins in the cross direction thereof so as to hold the width of the web in the entire drying step or partly in the drying step, as described in JP-A 62-46625. Preferably, the drying temperature in the drying step is from 100 to 145° C. The drying temperature, the drying air flow and the drying time may differ depending on the solvent to be used, and may be suitably selected in accordance with the type and the combination of the solvents to be used.

In the invention, it is preferred that the plurally cast dopes are dried and then peeled away from the support.

Preferably, the time to be taken after the dopes are cast on the casting substrate and before the formed film is peeled away, or that is, the time for which the film is conveyed on the casting substrate is at most 60 seconds, more preferably at most 30 seconds.

<Stretching Step>

The production method of the invention may include a step of stretching the formed laminate film, after the film formation step.

In producing the film of the invention, preferably, the web (film) peeled from the support is stretched while the residual solvent content in the web is less than 120% by mass.

The residual solvent content may be represented by the following formula:

$$\text{Residual Solvent Content (\% by mass)} = \{(M-N)/N\} \times 100$$

wherein M means the mass of a web at a given point in time, and N means the mass of the web, of which M has been measured, after dried at 110° C. for 3 hours. In case where the residual solvent content in the web is too large, then the stretching would be ineffective; but when too small, the web may be extremely difficult to stretch and may be cut. A more preferred range of the residual solvent in the web is from 10% by mass to 50% by mass, most preferably from 12% by mass to 35% by mass. When the draw ratio in stretching is too low, the stretched film could not obtain sufficient retardation; but when too high, the web may be difficult to stretch and may be cut.

The draw ratio in stretching may be generally from 5% to 100%, preferably from 15% to 40%. Stretching in one direction by from 5% to 100% means that the distance between the clips or pins to hold the film is expanded in a range of from 1.05 to 2.00 times relative to the original distance therebetween before stretching.

The film may be stretched in the film traveling direction (machine direction) or in the direction perpendicular to the film traveling direction (cross direction), or in both directions.

In the invention, the film formed in a mode of solution casting film formation may be stretched even though not heated at a high temperature so far as the residual solvent content therein falls within a specific range; however, preferably, the film is stretched with drying as capable of shortening the stretching step. In the invention, preferably, the stretching temperature in the stretching step is from 110 to 190° C., more preferably from 120 to 150° C. The stretching temperature is preferably not lower than 120° C. from the viewpoint of securing low haze of the film, and is preferably not higher than 150° C. from the viewpoint of enhancing the optical performance expressibility thereof (from the viewpoint of thickness reduction of the film).

On the other hand, when the temperature of the web is too high, then the plasticizer therein may evaporate away; and therefore in case where a volatile low-molecular plasticizer is used therein, the temperature of the web is preferably within a range of room temperature (15° C.) to 145° C.

Stretching the film in biaxial directions perpendicular to each other is effective from the viewpoint of enhancing the optical performance expressibility of the film, especially from the viewpoint of increasing Rth (retardation) of the film.

In the invention, the film may be stretched simultaneously in biaxial directions in the stretching step, or may be stretched successively in biaxial directions. In the case where the film is stretched successively in biaxial directions, the stretching temperature may vary in every stretching in different directions.

In the case of simultaneous biaxial stretching, the film of the invention can be obtained even when stretched at a stretching temperature of from 110° C. to 190° C.; and the stretching temperature in simultaneous biaxial stretching is more preferably from 120° C. to 150° C., even more preferably from 130° C. to 150° C. Simultaneous biaxial stretching may increase the haze of the film in some degree, but can further enhance the optical performance expressibility of the film.

On the other hand, in the case of successive biaxial stretching, preferably, the film is first stretched in the direction parallel to the film traveling direction and then in the direction perpendicular to the film traveling direction. A more preferred range of the stretching temperature in successive stretching is the same as the preferred stretching temperature range for the above-mentioned simultaneous biaxial stretching.

<Heat Treatment Step>

Preferably, the film production method of the invention includes a heat treatment step after the drying step. The heat treatment in the heat treatment step may be attained after the drying step, and the treatment may be attained just after the stretching/drying step, or may be attained in a different mode where the film is once wound up after the drying step and then heat-treated in an additional heat treatment step. In the invention, preferably, the heat treatment step is additionally provided after the drying step and after the film has been once cooled to room temperature to 100° C. or lower. This mode is advantageous in that a film having more excellent thermal dimension stability can be obtained. For the same reason, also preferably, the film is dried to have a residual solvent content of less than 2% by mass, more preferably less than 0.4% by mass just before the heat treatment step.

The heat treatment may be attained according to a method of applying air at a predetermined temperature to the film being conveyed, or a method of using a heating means such as microwaves, etc.

Preferably, the heat treatment is attained at a temperature of from 150 to 200° C., more preferably from 160 to 180° C. Also preferably, the heat treatment is attained for from 1 to 20 minutes, more preferably from 5 to 10 minutes.

<Heated Water Vapor Treatment>

The stretched film may be thereafter processed in a step of applying thereto water vapor heated at 100° C. or higher. The water vapor applying step is preferred since, in the step, the residual stress of the produced optical film may be relaxed and the dimensional change thereof may be reduced. Not specifically defined, the temperature of the water vapor is 100° C. or higher; however, in consideration of the heat resistance of the film, the temperature of the water vapor may be at most 200° C.

<Surface Treatment Step>

In case where the optical film of the invention is used as a protective film for polarizer and where the film is stuck to a polarizing element, preferably, the film is processed through acid treatment, alkali treatment, plasma treatment, corona treatment or the like for hydrophilicating the surface thereof, from the viewpoint of the adhesiveness of the film to the polarizing element.

Since the optical film of the invention has an outer layer of a cellulose acylate on at least one side thereof, it is especially desirable that the cellulose acylate layer of the film is alkali-saponified to thereby enhance the adhesiveness thereof to a polarizing element of polyvinyl alcohol generally used in the art. In case where the film does not have the outer layer, an adhesive will be necessary, which, however, is disadvantageous as lowering the production efficiency.

[Polarizer]

The polarizer of the invention comprises a polarizing element and the optical film of the invention.

The optical film of the invention may be used in a polarizer having a polarizing element and, as arranged on at least one side thereof, a protective film, as the protective film therein.

Regarding the configuration of polarizer, in an embodiment where a protective film is arranged on both surfaces of the polarizing element therein, the optical film of the invention may be used as one protective film or the retardation film therein.

The polarizing element includes a iodine-based polarizing element, a dichroic dye-containing dye-based polarizing element and a polyene-type polarizing element. The iodine-based polarizing element and the dye-based polarizing element may be produced generally using a polyvinyl alcohol film.

[Liquid Crystal Display Device]

The liquid crystal display device of the invention comprises the optical film of the invention or the polarizer of the invention.

The optical film and the polarizer of the invention can be advantageously used in image display devices such as liquid crystal display devices and others, and is favorably used therein as the outermost layer on the backlight side.

In general, a liquid crystal display device comprises a liquid crystal cell and two polarizers arranged on both sides of the cell, in which the liquid crystal cell carries liquid crystal between two electrode substrates. Further, one optically anisotropic layer may be arranged between the liquid crystal cell and one polarizer, or two optically anisotropic layers may be arranged between the liquid crystal cell and both polarizers in the device.

Preferably, the liquid crystal cell is a TN-mode, VA-mode, OCB-mode, IPS-mode or ECB-mode cell.

The optical film of the invention is especially favorably used in IPS-mode liquid crystal display devices. Of the optical film of the invention, both the in-plane retardation Re and the thickness-direction retardation Rth thereof can be reduced, and therefore the film is favorable in IPS-mode liquid crystal display devices.

EXAMPLES

The characteristics of the invention are described more concretely with reference to Examples given below.

In the following Examples, the material used, its amount and ratio, the details of the treatment and the treatment process may be suitably modified or changed. Accordingly, the invention should not be limitatively interpreted by the Examples given below.

Unless otherwise specifically indicated, "part" is by weight.

[Measurement Methods]

<Condition for Measurement of Weight-Average Molecular Weight>

The weight-average molecular weigh was measured through gel permeation chromatography. The condition for the measurement is as follows:

| | |
|---|---|
| Solvent | tetrahydrofuran |
| Apparatus | TOSOH HLC-8220GPC |
| Column | Three columns of TOSOH TSKgel Super HZM-H (4.6 mm × 15 cm) were connected. |
| Column temperature | 25° C. |
| Sample concentration | 0.1% by mass |
| Flow rate | 0.35 ml/min |
| Calibration curve | Calibration curves made with 7 samples of TOSOH's TSK standard polystyrene (Mw = 2800000 to 1050) were used. |

Examples 1 to 6, Comparative Examples 1 to 4

Preparation of Lactone Ring-Containing Acrylic Resin B1

10000 g of methyl methacrylate (MMA), 2500 g of methyl 2-(hydroxymethyl)acrylate (MHMA), and 12500 g of toluene were put into a 60-L reactor equipped with a stirrer, a temperature sensor, a condenser tube and a nitrogen-introducing duct, and heated up to 105° C. with introducing nitrogen thereinto, and at the time when the system began to reflux, 10.0 g of an initiator, tertiary amylperoxy isononanoate (Atofina Yoshitomi's trade name, Lupasol 570) was added thereto, and at the same time, a solution comprising 20.0 g of the initiator and 100 g of toluene was dropwise added thereto taking 4 hours; and under the condition, the system was polymerized in a mode of solution polymerization under reflux (105 to 110° C.), and then ripened for 4.5 hours.

10 g of stearyl phosphate/distearyl phosphate mixture (Sakai Chemical's trade name, Phoslex A-18) was added to the obtained polymer solution, and reacted for cyclization condensation under reflux (90 to 110° C.) for 6 hours. Next, the polymer solution obtained through the cyclization condensation reaction was introduced into a vent-type double-screw extruder (φ=29.75 mm, L/D=30) having a barrel temperature of 260° C., a rotation number of 100 rpm, a reduced pressure of from 13.3 to 400 hPa (10 to 300 mmHg), one rear-vent and four fore-vents, at a flow rate of 2.0 kg/hour in terms of the resin amount, and in the extruder, this was processed for cyclization condensation reaction with volatile removal, and then extruded out to give pellets of a transparent lactone ring-containing acrylic resin B1. The lactone cyclization degree of the lactone ring-containing acrylic resin pellets was 97.0%, the weight-average molecular weight thereof was 154300, and Tg (glass transition temperature) thereof was 130° C.

(Preparation of Dope Solution B)

The lactone ring-containing acrylic resin B1 obtained in the above was dissolved in a mixed solvent of methylene chloride/methanol (80/20 by weight) to prepare a dope solution B (having a solid concentration of 25%, and a complex viscosity of 50 Pa·s).

(Preparation of Cellulose Acylate Dope Solution A)

100 parts by mass of acetyl cellulose having a degree of acetyl substitution of 2.86, and 15 parts by mass of the following compound were dissolved in a mixed solvent of methylene chloride/methanol (80/20 by weight) to prepare a dope solution A (having a solid concentration of 18% by mass, and a complex viscosity of 15 Pa·s).

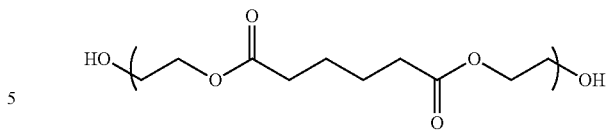

(Oligomer with the above-mentioned recurring unit, having a weight-average molecular weight of 1000)

The dope solution A to be the outer layer and the dope solution B to be the core layer were cast in a mode of solution casting film formation to form a film configuration as shown in Table 1 below, thereby producing an optical film of Examples and Comparative Examples. Concretely, the dopes were continuously cast through a three-layer co-casting die onto a metal support in a mode of continuous co-casting film formation to thereby form the layer configuration as shown in Table 1 below, outer layer A-1, core layer B and outer layer A-2 from the metal support surface side, in which the thickness of each layer was controlled as in Table 1. The film thickness configuration is in terms of the thickness of each layer that was assumed to be a film having a uniform thickness, based on each dope flow rate. While on the metal support, the dopes were dried with dry air at 40° C. to form a film thereon, then the film was peeled away, and with both sides of the film kept held with pins and with the distance between the pins kept constant, the film was dried with dry air at 105° C. for 5 minutes. After the pins were removed, the film was further dried at 130° C. for 20 minutes. In that manner, optical films of Examples 1 to 6 and optical films of Comparative Examples 1 to 4 were produced.

Example 7

100 parts by mass of acetyl cellulose having a degree of acetyl substitution of 2.86, and 15 parts by mass of the following compound were dissolved in a mixed solvent of methylene chloride/methanol (80/20 by weight) to prepare a dope solution A' (having a solid concentration of 21% by mass and a complex viscosity of 30 Pa·s).

In the same manner as in Example 3 except that the dope solution A' was used in place of the dope solution A, a three-layer optical film of Example 7 was produced.

[Evaluation]

(Folding Test)

The optical film obtained in Examples and Comparative Examples was cut into a piece having a size of 3 cm×20 cm, and folded at 180 degrees; and before and after the folding test, the film was checked for the condition (brittleness) thereof. As a result, the samples that had been easily folded and did not change at all after repeatedly folded 5 times were evaluated as good "A"; those of which both the outer layer and the core layer had not cracked after folded 5 times, but which had had the folded line were evaluated as moderate "B"; and those of which the core layer had cracked after folded 5 times were evaluated as bad "C". The obtained results are shown in Table 1.

(Photoelastic Coefficient)

A sample of 1 cm×5 cm was cut out of the formed optical film, and using a spectroscopic ellipsometer (JASCO's M-220), the in-plane retardation of the sample was measured with applying stress thereto at 25° C.; and from the retardation value and the inclination of the stress coefficient, the photoelastic coefficient was computed. The obtained results are shown in Table 1.

(Humidity Dependence of Rth (ΔRth))

Regarding the change in the retardation value with humidity change, Rth (Rth(10%)) of the film was measured according to the same method as in this description except that the film was conditioned at 25° C. and at a relative humidity of 10% for 12 hours, Rth (Rth(80%)) of the film was measured according to the same method as in this description except that the film was conditioned at 25° C. and at a relative humidity of 80% for 12 hours, and the humidity dependence of Rth, ΔRth was computed from the found data. Concretely, ΔRth=Rth(10%)−Rth(80%); and the obtained results are shown in Table 1.

<Production of Polarizer>

Each film produced in Examples and Comparative Examples and Fujitac TD60UL (by FUJIFILM) were dipped in an aqueous, 4.5 mol/L sodium hydroxide solution (saponification liquid) conditioned at 37° C., for 1 minute, then the films were washed with water, thereafter dipped in an aqueous 0.05 mol/L sulfuric acid solution for 30 seconds, and further led to pass through a water-washing bath. Using an air knife, the films were dewatered repeatedly three times to thereby remove water, and then kept in a drying zone at 70° C. for 15 seconds and thus dried, thereby producing saponified films.

According to Example 1 in JP-A 2001-141926, a film was stretched in the machine direction, between two pairs of nip rolls having a different peripheral speed to prepare a polarizing element having a thickness of 20 p.m.

Thus obtained, the polarizing element was sandwiched between any two of the saponified films, and then stuck together using an adhesive of an aqueous 3% PVA (Kuraray's PVA-117H) solution in a roll-to-roll process in such a manner the polarization direction of the polarizing element could be perpendicular to the machine direction of the film, thereby producing a polarizer. In this, one film on the polarizing element is one selected from the saponified films shown in Table 1, and the other film thereon is the saponified Fujitac TD60UL.

(Evaluation of Sticking to PVA Polarizing Element)

The samples were checked for the sticking of the film to the PVA polarizing element according to the standards mentioned below, and the results are shown in Table 1.
A: The film did not peel away from the polyvinyl alcohol.
B: The film readily peeled away from the polyvinyl alcohol.

(Evaluation in Mounting on Liquid Crystal Display Device)

(Mounting on IPS-Mode Liquid Crystal Display Device)

The polarizers set to sandwich the liquid crystal cell were peeled away from a commercially-available liquid crystal television (IPS-mode slim-type 42-inch liquid crystal television), and the previously produced polarizers were re-adhered to the liquid crystal cell using an adhesive, in such a manner that the optical film of the invention shown in Table 1 could face the liquid crystal cell side. Thus reconstructed, the liquid crystal television was kept in an environment at 40° C. and at a relative humidity of 80% for 10 days, and then transferred into an environment at 25° C. and at a relative humidity of 60%, in which the television was kept ON in a condition of black level of display, and after 48 hours, the panel was visually checked for the presence or absence of display unevenness.

(Front Direction Display Unevenness Level)

The panel was watched in the front direction of the device and visually checked for the brightness unevenness at the time of black level of display, and the device was evaluated according to the following evaluation standards. The results are shown in Table 1.
A: Little display unevenness was seen in the environment at an illumination intensity of 100 lx.
B: Some but slight display unevenness was seen in the environment at an illumination intensity of 100 lx.
C: Definite display unevenness was seen in the environment at an illumination intensity of 100 lx.

TABLE 1

| | Dope | | Thickness of Laminate (μm) | | | Optical Film Performance | | | | | | |
|---|---|---|---|---|---|---|---|---|---|---|---|---|
| | Core Layer Dope | Outer Layer Dope | Core Layer B | Outer Layer A-1 (support side) | Outer Layer A-2 (air interface side) | Outer Layer Proportion (%) | Folding Test | Photoelastic Coefficient ×10 [Pa] | Re [nm] | Rth [nm] | Optical Humidity Change Rth Humidity Dependence (nm) | Sticking to PVA Polarizing Element | Panel Evaluation Panel Display Unevenness |
| Example 1 | B | A | 50 | 3.3 | — | 6.2 | B | −0.3 | 0.0 | −0.3 | 1.2 | A | A |
| Example 2 | B | A | 50 | 3.3 | 3.3 | 11.7 | A | 0.3 | 0.1 | −0.4 | 2.2 | A | A |
| Example 3 | B | A | 50 | 5 | 5 | 16.7 | A | 0.8 | 0.3 | −0.6 | 3.1 | A | A |
| Example 4 | B | A | 50 | 10 | 10 | 28.6 | A | 2.1 | 0.5 | −1.0 | 5.2 | A | A |
| Example 5 | B | A | 34 | 3.3 | 3.3 | 16.3 | A | 0.8 | 0.2 | −0.6 | 3.0 | A | A |
| Example 6 | B | A | 30 | 7.5 | 7.5 | 33.3 | A | 2.7 | 0.6 | −1.2 | 6.1 | A | B |
| Example 7 | B | A' | 50 | 5 | 5 | 16.7 | A | 0.8 | 0.3 | −0.6 | 3.1 | A | A |
| Comparative Example 1 | B | A | 50 | — | — | 0.0 | C | −1.0 | 0.1 | −4.0 | 0.1 | B | — |
| Comparative Example 2 | B | A | 50 | 0.5 | 0.5 | 2.0 | C | −1.2 | 0.1 | −0.1 | 0.7 | B | — |
| Comparative Example 3 | B | A | 50 | 1.5 | 1.5 | 5.7 | C | −1.0 | 0.0 | −0.2 | 1.0 | A | A |
| Comparative Example 4 | B | A | 50 | 25 | 25 | 50.0 | A | 4.5 | 1.0 | −1.8 | 9.1 | A | C |

From Table 1, it is known that the optical films of Examples 1 to 7 have an outer layer of a cellulose acylate, and are therefore sufficient in point of the sticking thereof to the polarizing element and have a sufficient strength in the folding test. In addition, it is known that the photoelastic coefficient of the optical films is small and the humidity-dependent optical change thereof is small, and therefore the films are excellent in the performance thereof of panel display evenness. Further, the polarizer comprising the optical film of the invention is excellent in the adhesiveness of the film to the polarizing element, and the sticking of the film to polyvinyl alcohol is sufficient, or that is, the optical film of the invention has excellent workability for polarizer production.

From Comparative Examples 1 and 2 in which the thickness of the outer layer is much smaller than the lowermost limit in the invention, it is known that the sticking of the film to PVA is poor and the film is brittle. In addition, in Comparative Examples 1 and 2, polarizer could not be produced in an ordinary sticking process of the film to PVA, and therefore in these, polarizer could not be obtained and the panel mounting test could not be attained. From Comparative Example 3 where the thickness of the outer layer is slightly smaller than the lowermost limit in the invention, it is known that the film is brittle. From Comparative Example 4 where the thickness of the outer layer is more than the uppermost limit in the invention, it is known that the photoelastic coefficient of the film is large and the humidity-dependent optical change thereof is large, or that is, the film is poor in point of the optical performance thereof and therefore the panel comprising the film has a problem of display unevenness.

While the present invention has been described in detail and with reference to specific embodiments thereof, it will be apparent to one skilled in the art that various changes and modifications can be made therein without departing from the spirit and scope thereof.

The present disclosure relates to the subject matter contained in Japanese Patent Application No. 2010-214998, filed on Sep. 27, 2010, the contents of which are expressly incorporated herein by reference in their entirety. All the publications referred to in the present specification are also expressly incorporated herein by reference in their entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

What is claimed is:

1. An optical film having three layers consisting of:
a core layer containing a (meth)acrylic resin having a lactone ring structure and having a thickness of from 10 to 100 μm,
wherein the lactone ring structure is represented by the following formula (1):

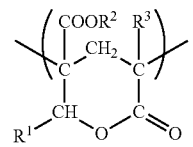

wherein $R^1$, $R^2$ and $R^3$ each independently represent a hydrogen atom, or an organic residue having from 1 to 20 carbon atoms; and
two outer layers wherein each one outer layer is formed on both sides of the core layer, the outer layer containing a cellulose acetate and having a thickness of from more than 3 μm to 20 μm,
wherein the cellulose acetate resin satisfies the following condition:

$$2.5 \leq TA2 \leq 3.0$$

wherein TA2 means the degree of substitution with acyl group having 2 carbon atoms, and
wherein the proportion of the total thickness of the outer layers to the total thickness of the film is from 2 to 20%.

2. The optical film according to claim 1, wherein the proportion of the total thickness of the outer layers to the total thickness of the film is from 6.2 to 16.7%.

3. The optical film according to claim 1, which has a photoelastic coefficient of from −3.0 to 3.0×10$^{-12}$ Pa$^{-1}$.

4. The optical film according to claim 1, wherein the residual solvent amount in the core layer is at least 0.004% by mass.

5. The optical film according to claim 1, wherein the content of the lactone ring structure represented by the formula (1) in the structure of the (meth)acrylic resin having a lactone ring structure is from 5 to 90% by weight.

6. The optical film according to claim 1, wherein the weight-average molecular weight of the acrylic resin is at least 80000.

7. The optical film according to claim 1, wherein the (meth)acrylic resin having a lactone ring structure has a glass transition temperature of not lower than 115° C.

8. A polarizer having a polarizing element and an optical film, wherein the optical film has three layers consisting of:
a core layer containing a (meth)acrylic resin having a lactone ring structure and having a thickness of from 10 to 100 μm,
wherein the lactone ring structure is represented by the following formula (1):

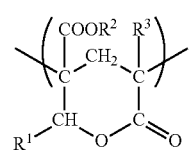

wherein $R^1$, $R^2$ and $R^3$ each independently represent a hydrogen atom, or an organic residue having from 1 to 20 carbon atoms; and
two outer layers wherein each one outer layer is formed on both sides of the core layer, the outer layer containing a cellulose acetate and having a thickness of from more than 3 μm to 20 μm, wherein the cellulose acetate resin satisfies the following condition:

$2.5 \leq TA2 \leq 3.0$ wherein TA2 means the degree of substitution with acyl group having 2 carbon atoms, and wherein the proportion of the total thickness of the outer layers to the total thickness of the film is from 2 to 20%.

9. The polarizer having a polarizing element and an optical film according to claim 8, wherein the proportion of the total thickness of the outer layers to the total thickness of the film is from 6.2 to 16.7%.

10. A liquid crystal display device having an optical film having three layers consisting of:
a core layer containing a (meth)acrylic resin having a lactone ring structure and having a thickness of from 10 to 100 μm,
wherein the lactone ring structure is represented by the following formula (1):

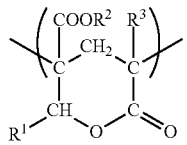
(1)

wherein $R^1$, $R^2$ and $R^3$ each independently represent a hydrogen atom, or an organic residue having from 1 to 20 carbon atoms; and two outer layers wherein each one outer layer is formed on both sides of the core layer, the outer layer containing a cellulose acetate and having a thickness of from more than 3 μm to 20 μm on at least one side of the core layer, wherein the cellulose acetate resin satisfies the following condition:

$2.5 \leq TA2 \leq 3.0$ wherein TA2 means the degree of substitution with acyl group having 2 carbon atoms, and wherein the proportion of the total thickness of the outer layers to the total thickness of the film is from 2 to 20%.

11. The liquid crystal display device of claim 10, which is an IPS-mode device.

12. The liquid crystal display device having an optical film according to claim 10, wherein the proportion of the total thickness of the outer layers to the total thickness of the film is from 6.2 to 16.7%.

* * * * *